(12) United States Patent
Liu

(10) Patent No.: US 10,484,315 B2
(45) Date of Patent: *Nov. 19, 2019

(54) METHOD, SYSTEM AND APPARATUS FOR ADDING NETWORK COMMENT INFORMATION

(71) Applicant: Tencent Technology (Shenzhen) Company Limited, Shenzhen (CN)

(72) Inventor: Huazhong Liu, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/152,215

(22) Filed: Oct. 4, 2018

(65) Prior Publication Data

US 2019/0036855 A1   Jan. 31, 2019

Related U.S. Application Data

(63) Continuation of application No. 14/617,762, filed on Feb. 9, 2015, now Pat. No. 10,129,188, which is a
(Continued)

(30) Foreign Application Priority Data

Sep. 13, 2013  (CN) .......................... 2013 1 0416572

(51) Int. Cl.
  *H04L 12/58*   (2006.01)
  *G06F 16/958*   (2019.01)
  *G06F 3/0484*   (2013.01)

(52) U.S. Cl.
  CPC ........ *H04L 51/046* (2013.01); *G06F 3/04842* (2013.01); *G06F 16/958* (2019.01)

(58) Field of Classification Search
  CPC ... H04L 51/046; G06F 16/958; G06F 3/04842
  See application file for complete search history.

(56) References Cited

U.S. PATENT DOCUMENTS 9,026,900 B1    5/2015   Pugh
2004/0117750 A1  6/2004   Skoll et al.
(Continued)

FOREIGN PATENT DOCUMENTS

CN    101414307 A   4/2009
CN    2010141749 A  6/2010
(Continued)

OTHER PUBLICATIONS

Tencent Technologym ISRWO, PCT/CN2014/086137, Dec. 8, 2014, 7 pgs.
(Continued)

*Primary Examiner* — Angie Badawi
(74) *Attorney, Agent, or Firm* — Morgan, Lewis & Bockius LLP

(57) ABSTRACT

Method of adding user comments on webpages is performed by a computing device. After displaying a webpage including a visual object, the computing device receives a user selection of a portion of the visual object and generates a transparent layer including a comment entry region within the webpage. The comment entry region includes an enlarged visual content of the portion of the visual object as a background. The device then concurrently displays the enlarged visual content of the portion of the visual content in the comment entry region and the remaining portion of the visual object of the webpage that is not selected by the user. After receiving a user comment in a graphical form through the comment entry region, the device sends the user comment and a corresponding user identifier to a server. The
(Continued)

server generates a revised webpage by combining the visual object and the user comment.

18 Claims, 11 Drawing Sheets

Related U.S. Application Data continuation of application No. PCT/CN2014/086137, filed on Sep. 9, 2014.

(56) References Cited

U.S. PATENT DOCUMENTS

| | | |
|---|---|---|
| 2011/0154192 A1 | 6/2011 | Yang et al. |
| 2011/0191211 A1 | 8/2011 | Lin |
| 2013/0265311 A1 | 10/2013 | Na |
| 2014/0372540 A1 | 12/2014 | Libin |

FOREIGN PATENT DOCUMENTS

| | | |
|---|---|---|
| CN | 102292713 A | 12/2011 |
| CN | 102455868 A | 5/2012 |
| CN | 102567452 A | 7/2012 |
| CN | 102609401 A | 7/2012 |
| CN | 102682025 A | 9/2012 |
| CN | 102693242 A | 9/2012 |
| CN | 102799573 A | 11/2012 |
| CN | 102890604 A | 1/2013 |
| CN | 103150325 A | 6/2013 |
| CN | 103186533 A | 7/2013 |

OTHER PUBLICATIONS

Tencent Technologym IPRP, PCT/CN2014/086137, Mar. 15, 2016, 5 pgs.

What is the most beautiful song of Singer A?

*Through The Time, Once You, It's New For Every Moment* are all very popular. *Through The Time* is a very classic album, every song in this album is worth hearing, and *Time, Walk, One Day,* and *Present* are all highly commended. I do not prefer the latter two though. Hope you can find a song you like~

FIG. 2a

What is the most beautiful song of Singer A?

*My favorite* 
*Through The Time, Once You, It's New For Every Moment* are all very popular. *Through The Time* is a very classic album, every song in this album is worth hearing, and *Time, Walk, One Day,* and *Present* are all highly commended. I do not prefer the latter two though. Hope you can find a song you like~

FIG. 2b

METHOD, SYSTEM AND APPARATUS FOR ADDING NETWORK COMMENT INFORMATION

RELATED APPLICATIONS

This application is a continuation application of U.S. application Ser. No. 14/617,762, entitled "METHOD, SYSTEM AND APPARATUS FOR ADDING NETWORK COMMENT INFORMATION" filed on Feb. 9, 2015, which is a continuation application of PCT Patent Application No. PCT/CN2014/086137, entitled "METHOD, SYSTEM AND APPARATUS FOR ADDING NETWORK COMMENT INFORMATION" filed on Sep. 9, 2014, which claims priority to Chinese Patent Application No. 201310416572.3, entitled "METHOD, SYSTEM AND APPARATUS FOR ADDING NETWORK COMMENT INFORMATION" filed on Sep. 13, 2013, all of which are incorporated by reference in their entirety.

FIELD OF THE TECHNOLOGY

The present technology relates to the field of computer and Internet data processing technologies, and in particular, to a method and a system for adding network comment information, and corresponding apparatus.

BACKGROUND OF THE TECHNOLOGY

Currently, with development of Internet technologies, the network has gradually become an important source for people to acquire information. Especially, after the Internet enters the age of Web 2.0, users are not only browsers of website content, but also creators of the website content. Content creation website along with the participation of users is called User Generated Content ("UGC"), such as blogs or photos posted by the users. In the age of Web 2.0, information in Internet increases exponentially due to emergence of a large amount of the UGC, which makes huge impacts on accumulation and dissemination of human knowledge.

A UGC website system is where the UGC is often posted. For example, a currently common UGC website system includes: a twitter system, a Social Network Service (SNS) system, a community forum system, a knowledge sharing system, etc.

The very nature of UGC creates a demand for interactive comments. Currently, users may write some comments on some UGC content, e.g., commenting a news article. The comment text associates with the UGC, and when the user browses the comment on the UGC, the webpage displays the comment text associated with the UGC.

SUMMARY

The UGC comment system in the exiting technical solution has the following disadvantages: all comments are input, stored, and displayed in a text format, and when the comments are displayed, comments are successively displayed in a list form, and with no intuitive visual relationship with the commented UGC. For example, in a forum system, a user makes a comment on a certain UGC picture. There are many comments already and the comments are successively displayed under the UGC picture. The user's comment is displayed at the bottom of the webpage, far away the UGC picture, sometimes on a next page. Therefore, the user always needs to scroll or turn pages back and forth when comparing the comments and content of the UGC picture.

Further, all the comments can only be associated with whole content of the commented UGC. And the comments do not have a direct association relationship with certain specific content of the commented UGC. For example, a user makes a comment on a certain person in a graduation photo, and when another user browses the comment, the commented local detail needs to be looked for in the UGC picture according to the comment.

Therefore, it is desirable to enable the users to intuitively comment on the UGC contents and to have their comments being displayed with closer relationship with UGC contents.

In accordance with some implementations of the disclosed technology, a method of facilitating user comments on webpages, comprises: displaying a visual object as part of a webpage; detecting a user request for commenting on the visual object displayed in the webpage, the user request comprising a predetermined user input directed to the visual object displayed on the webpage; in response to the user request for commenting on the visual object, displaying a comment entry region overlaying at least part of the webpage; receiving a user comment in a graphical form through the comment entry region; and revising the visual object displayed in the webpage by sending the user comment in the graphical form and a corresponding user identifier to a server managing the webpage, wherein the server generates a revised visual object by combining the visual object and the user comment in the graphical form.

In another aspect, a device comprises one or more processors, memory, and one or more program modules stored in the memory and configured for execution by the one or more processors. The one or more program modules include instructions for performing the method described above. In another aspect, a non-transitory computer-readable storage medium having stored therein instructions when executed by a device causes the device to perform the method described above.

BRIEF DESCRIPTION OF THE DRAWINGS

The aforementioned features and advantages of the technology as well as additional features and advantages thereof will be more clearly understood hereinafter as a result of a detailed description of preferred embodiments when taken in conjunction with the drawings.

FIGS. 2a-2b are schematic display diagrams of text content being commented in accordance with some embodiments;

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
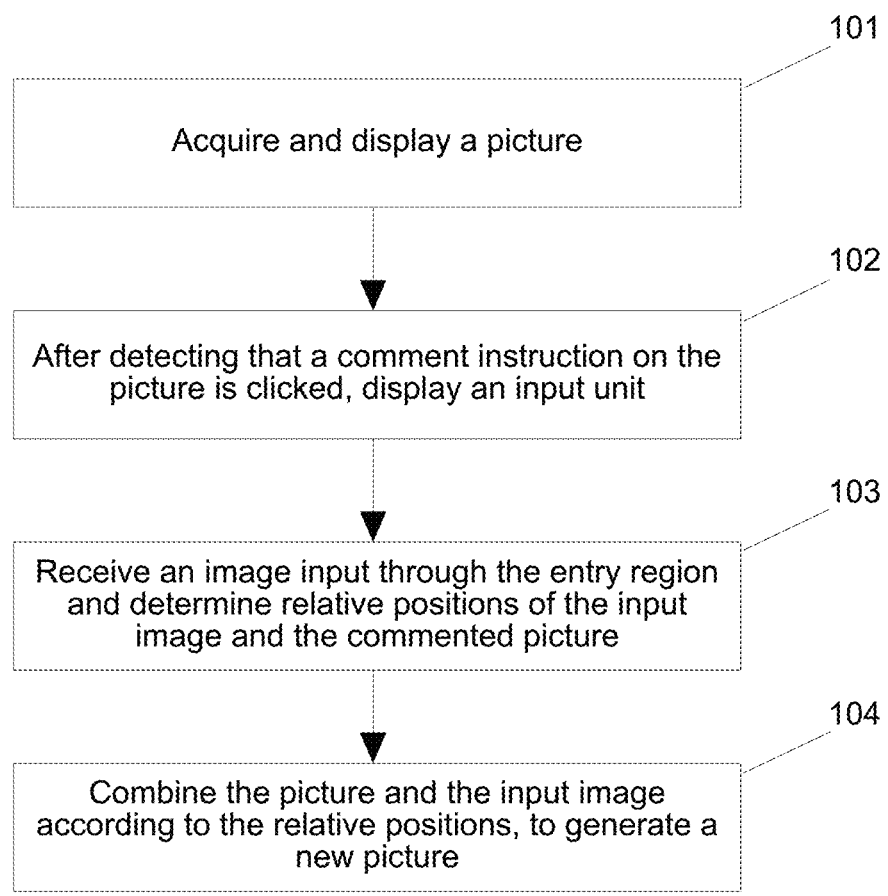
FIG. 1 is a flowchart of a method for adding network comment information in accordance with some embodiments.

FIG. 1 is a flowchart of a method for adding network comment information in accordance with some embodiments. The method mainly includes the following steps.

In accordance with some embodiments, in Step 101, a user device acquires and displays a picture.

In accordance with some embodiments, in Step 102, after detecting that a comment instruction on the picture is clicked, the user device displays an input unit. In accordance with some embodiments, the input unit is an entry region.

In accordance with some embodiments, in Step 103, the user device receives an image input through the entry region, and determines relative positions of the input image and the picture.

In accordance with some embodiments, in Step 104, the user device combines the picture and the input image according to the relative positions, to generate a new picture.

In accordance with some embodiments, when the method described is executed, the method may be executed from the user side, or may also be co-executed from the user side and the server side. One manner is that step 101 to step 103 are performed from the user side, the acquiring a picture is when the user side initiates a request from the server side, and the server side returns the picture to the user side. After step 103, the user side further transmits the input image and the relative positions to the server side. The server side performs step 104 and stores the new picture. The new picture may directly replace an original picture, or the new picture may be stored separately and the original picture is not deleted. When a user initializes a request for the picture; the server side returns the new picture to the user side that initializes the request. After receiving the new picture, the user side displays the new picture. Another manner may be that the user side performs step 101 to step 104, and uploads a generated new picture to the server side for saving. When a user side initializes a request for the picture, the server side returns the new picture to the user side initializing the request, and after receiving the new picture, the user side displays the new picture, that is, the user side then performs step 105.

In some embodiments, a commented object is a picture and final comment information is combined with the picture in a graphical form. In some embodiments, the commented object may also be UGC content in another form, such as text content. In some embodiments, the acquiring a picture in the step 101 includes: acquiring text content, converting the text content to a picture, then performing subsequent steps, finally replacing the text content with a new picture that is combined, and when a user requests viewing the text content, displaying the new picture. Subsequently, if another user comments, the method may be repeated, an image is input through the entry region based on the new picture. After the image is combined with the original picture, the new picture is generated and covers the previous picture. For example, user A creates a UGC, and uploads or generates a picture. User B comments on A's UGC with a text. User B's text comment is then viewed by A and B on the picture. If user C then comments on user A's UGC, then users A, B, and C can see the new comment as a new picture that covers B's picture.

FIG. 2a is a schematic display diagram of text content before being commented; and FIG. 2b is a schematic display diagram of a new picture generated through combination after a text content is commented.

In some embodiments, the method further includes: determining whether a trigger instruction for commenting on the picture is received, and after the trigger instruction is received, performing a subsequent step; otherwise, not performing the subsequent step. For example, a user B comments on a list of albums created by a user A. The user B accomplishes commenting by clicking on the comment button. However, the user B did not click on the instruction that will trigger how the user B's comment will be displayed in on the song the user B likes. The user B's comment will not be displayed until the instruction step is triggered.

In accordance with some embodiments, receiving a trigger instruction for commenting on the picture includes receiving clicking a "comment" button on a display interface of the picture. Once detecting that the "comment" button is clicked, the user device determines that the comment instruction for the picture is detected.

In some embodiments, the input unit may be transparent; if no image is entered into the input unit, the picture may be seen through the input unit. If an image is entered into the input unit, the input image may be superimposed on the picture. In some embodiments, the input unit may be a transparent computer drawing board, and may also be a transparent layer added and displayed on a webpage; and an image may be input on the transparent layer. For example, for a network user side using the Hypertext Markup Language (HTML) 5, canvas technologies of the HTML 5 can be used to display the transparent drawing board or the transparent layer on the user side. In some embodiments, a drawing tool may also be set, such as a color of a brush.

Figure 3A:
FIGS. 3a-3e are schematic diagrams of pictures being commented in accordance with some embodiments.
Figure 3B:
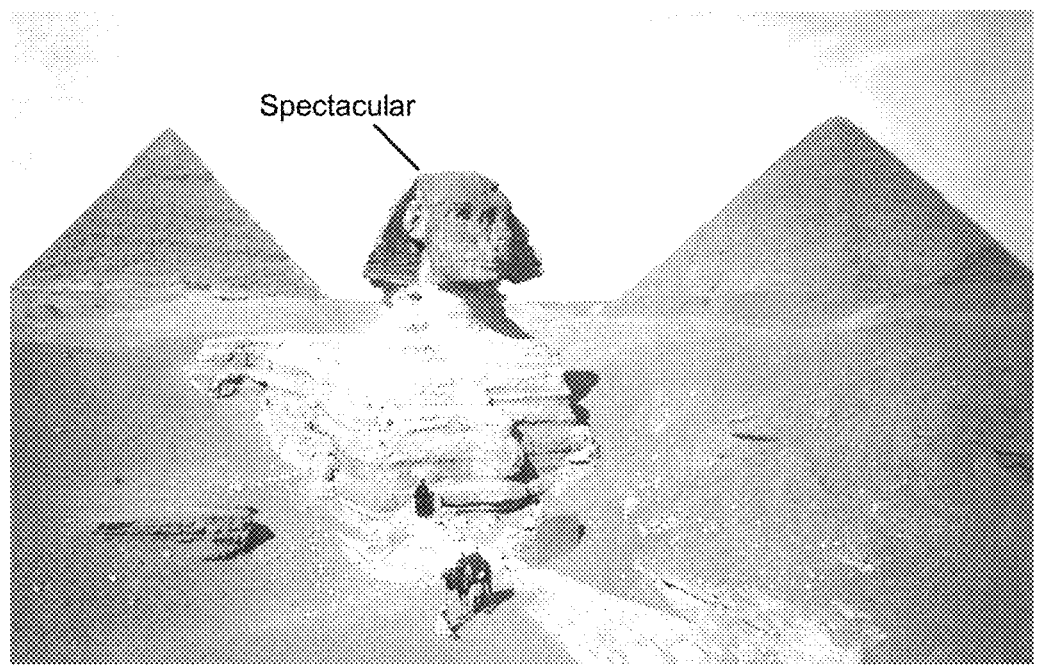
Figure 3C:
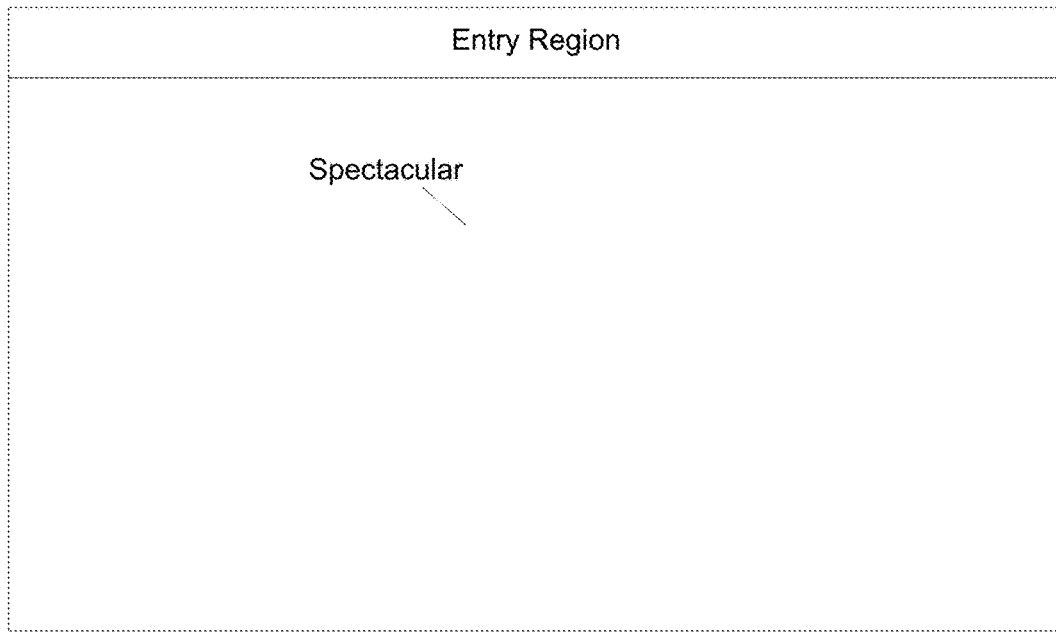

FIG. 3a is a schematic diagram of a picture before a comment is added. In reference to FIG. 3a, when a user clicks a "comment" button, the user device displays an input unit which is a transparent layer on a display area of a picture. Since the layer is transparent, the user may still see the picture. Then, the user may enter image information into the transparent layer. For example, a mouse is used to draw comment content in the transparent layer by clicking and scribing. If it is a touch device, the comment content may be drawn by touching the screen. FIG. 3b is a schematic diagram of a picture after a comment is added. The user inputs an image through the entry region. For example, an image character of "Spectacular" is drawn on the transparent layer, then the image character may cover the picture, and other parts on the transparent layer where the user does not draw remains transparent. Therefore, the user sees that the words "Spectacular" are written on the picture. FIG. 3c is a schematic diagram of an input image input by a user when being displayed separately.

In accordance with some embodiments, when the user clicks a "Submit" button, the relative positions of the picture and the input image is determined. The picture and the input image are combined according to the relative positions, to generate a new picture, e.g., the new picture as shown in FIG. 3b. When a user (no matter the commenter or another user) requests displaying the picture, the new picture may be displayed as FIG. 3b. For the user, if the user draws an image at any position on the picture, the image drawn by the user is displayed at a corresponding position on the new picture.

In accordance with some embodiments, displaying an input unit in step 102 specifically includes: identifying a clicking position of the comment instruction, and displaying the input unit at the clicking position in a specified limiting manner. The specified limiting manner is a relationship between a display position of the input unit and the clicking position. For example, a commonly used limiting manner is displaying the input unit with the clicking position as a central point.

In accordance with some embodiments, the displaying an input unit specifically includes: determining a display area of the picture in a webpage, and displaying the input unit in a specified area of the display area. The specified area may be a whole display area of the picture, or an area that is specified in advance in the picture. For example, if an area specified in advance is the left half part, the input unit such as a drawing board is displayed in the left half part of the picture.

In accordance with some embodiments, to facilitate webpage managers to review comment information added by the user, the method further includes: storing the input image and the relative positions; and outputting the input image and the relative positions to a reviewing interface. The reviewing interface is an interface provided to webpage managers, including a display module and an operation management module. In addition the reviewing interface may display the input image and the relative position of the input image in the picture. After the webpage managers review and approve, a review passing instruction may be input through the reviewing interface. After the review passing instruction of the reviewing interface for the input image is received, the picture and the input image are combined according to the relative positions, to generate a new picture.

In accordance with some embodiments, when the user adds new comment information to the picture, the foregoing steps may be performed repeatedly.

Figure 4:
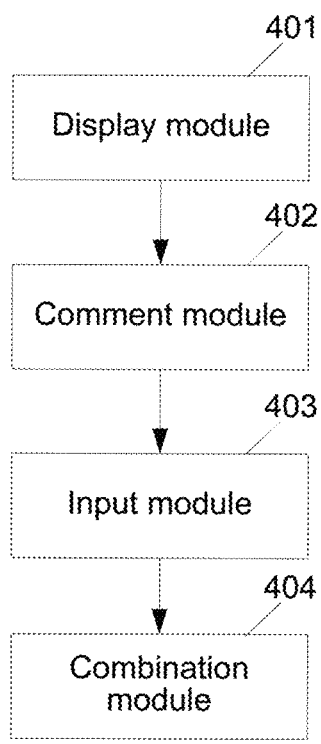
FIG. 4 is a schematic structural diagram of a system for adding network comment information in accordance with some embodiments.

FIG. 4 is a schematic structural diagram of a system for adding network comment information in accordance with some embodiments. The system includes: a display module 401, for acquiring and displaying a picture; a comment module 402, for displaying an input unit; an input module 403, for receiving an image input through the entry region, and determining relative positions of the input image and the picture; and a combination module 404, for combining the picture and the input image according to the relative positions, to generate a new picture. In accordance with some embodiments, the system further includes a storage module, for storing the new picture.

In accordance with some embodiments, the display module 401 is specifically used for directly acquiring the picture. Alternatively, in some embodiments, the commented content may also be a text, and the display module 401 is specifically used for acquiring text content.

In some embodiments, the comment module 402 is specifically used for identifying a clicking position of the comment instruction, and displaying the input unit on the clicking position in a specified limiting manner.

Figure 5:
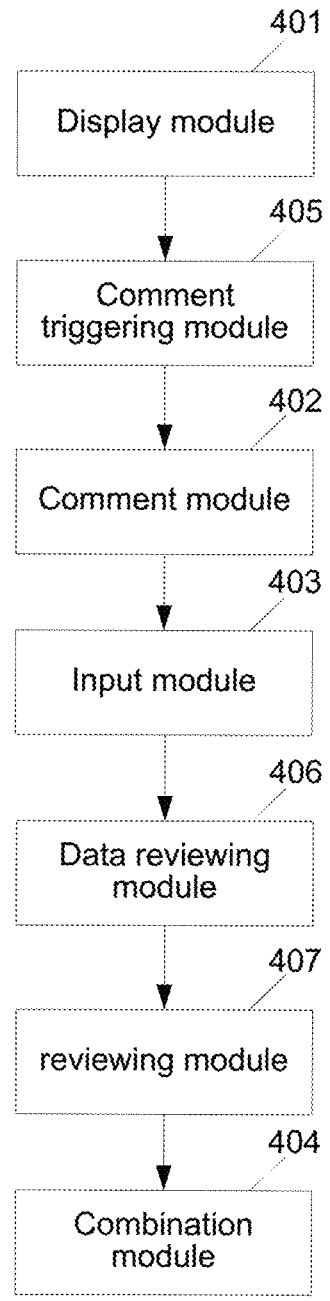
FIG. 5 is a schematic structural diagram of a system for adding network comment information in accordance with some embodiments.

FIG. 5 is a schematic structural diagram of a system for adding network comment information in accordance with some embodiments. In some embodiments, the system further includes: a comment triggering module 405, for determining whether a trigger instruction for commenting on a picture is received, and after the trigger instruction is received, triggering and starting the comment module.

In addition, in accordance with some embodiments, the system further includes: a data reviewing module 406, for storing the input image and the relative positions; and a reviewing module 407, for outputting the input image and the relative positions to a reviewing interface, and triggering and starting the combination module.

Figure 6:
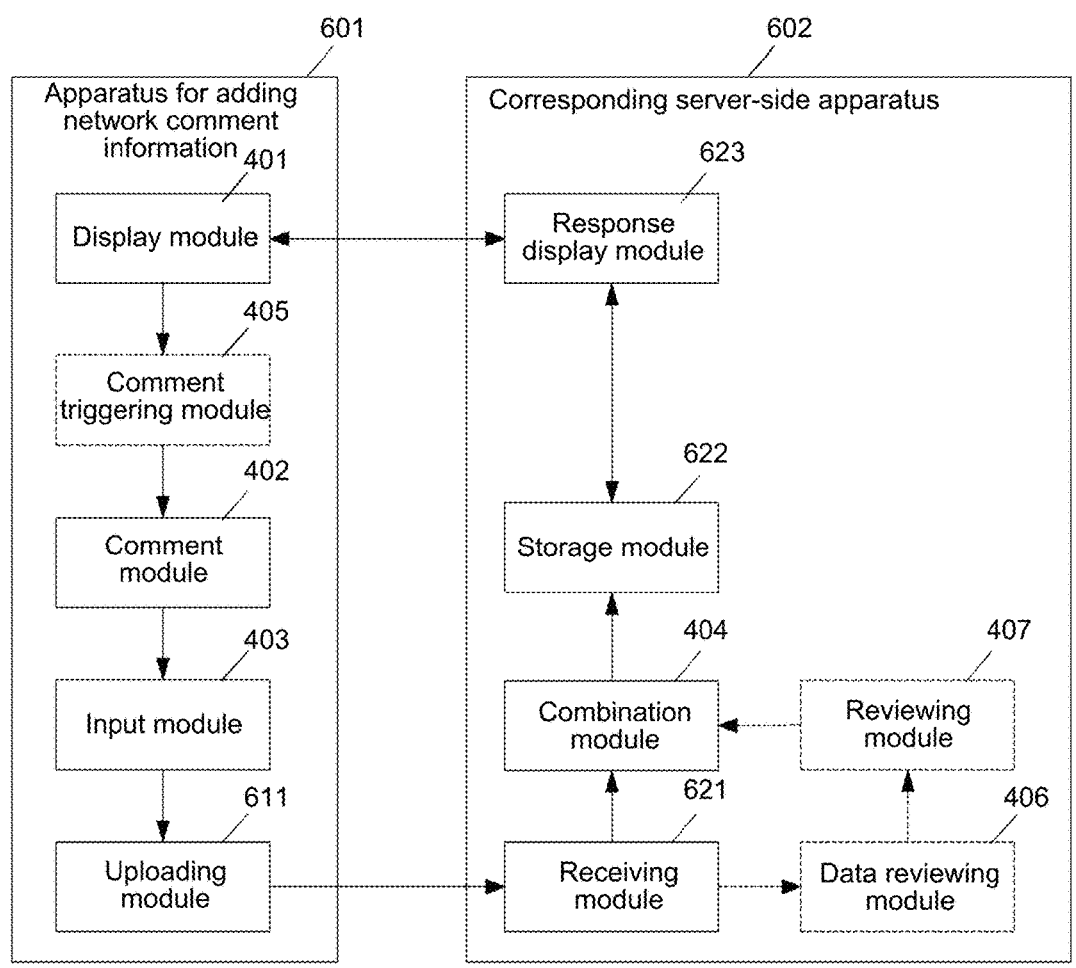
FIG. 6 is a schematic structural diagram of an apparatus for adding network comment information and a server in accordance with some embodiments.

FIG. 6 is a schematic structural diagram of an apparatus for adding network comment information and a server-side apparatus in accordance with some embodiments. The apparatus 601 for adding network comment information is set on a user side, and specifically includes: a display module 401, for acquiring and displaying a picture; a comment module 402, for displaying an input unit; an input module 403, for receiving an image input through the entry region, and determining relative positions of the input image and the picture; and an uploading module 611, for uploading the input image and the relative positions of the input image and the picture to a server.

In addition, in accordance with some embodiments, the apparatus further includes: a comment triggering module 405, for determining whether a trigger instruction for commenting on the picture is received, and after the trigger instruction is received, then triggering and starting the comment module.

In accordance with some embodiments, a server-side apparatus 602 includes: a receiving module 621, for receiving the input image uploaded by the apparatus 601 for adding network comment information and the relative positions of the input image and the picture; a combination module 404, for combining the picture and the input image according to the relative positions, to generate a new picture; a storage module 622, for storing the picture and the new picture; and a response display module 623, for responding to a request of the display module 401, reading the new picture from the storage module, and returning the new picture to the display module.

Afterwards, if a user comments on the new picture again, a new picture may be generated through combination and be stored in the storage module 622. If the display module on the user side requests the picture, a latest picture is returned to the display module on the user side for display.

To facilitate webpage managers to perform reviewing, the server-side apparatus 602 further includes: a data reviewing module 406, for storing the input image and the relative positions; and the reviewing module 407, for outputting the input image and the relative positions to a reviewing interface.

Figure 7:
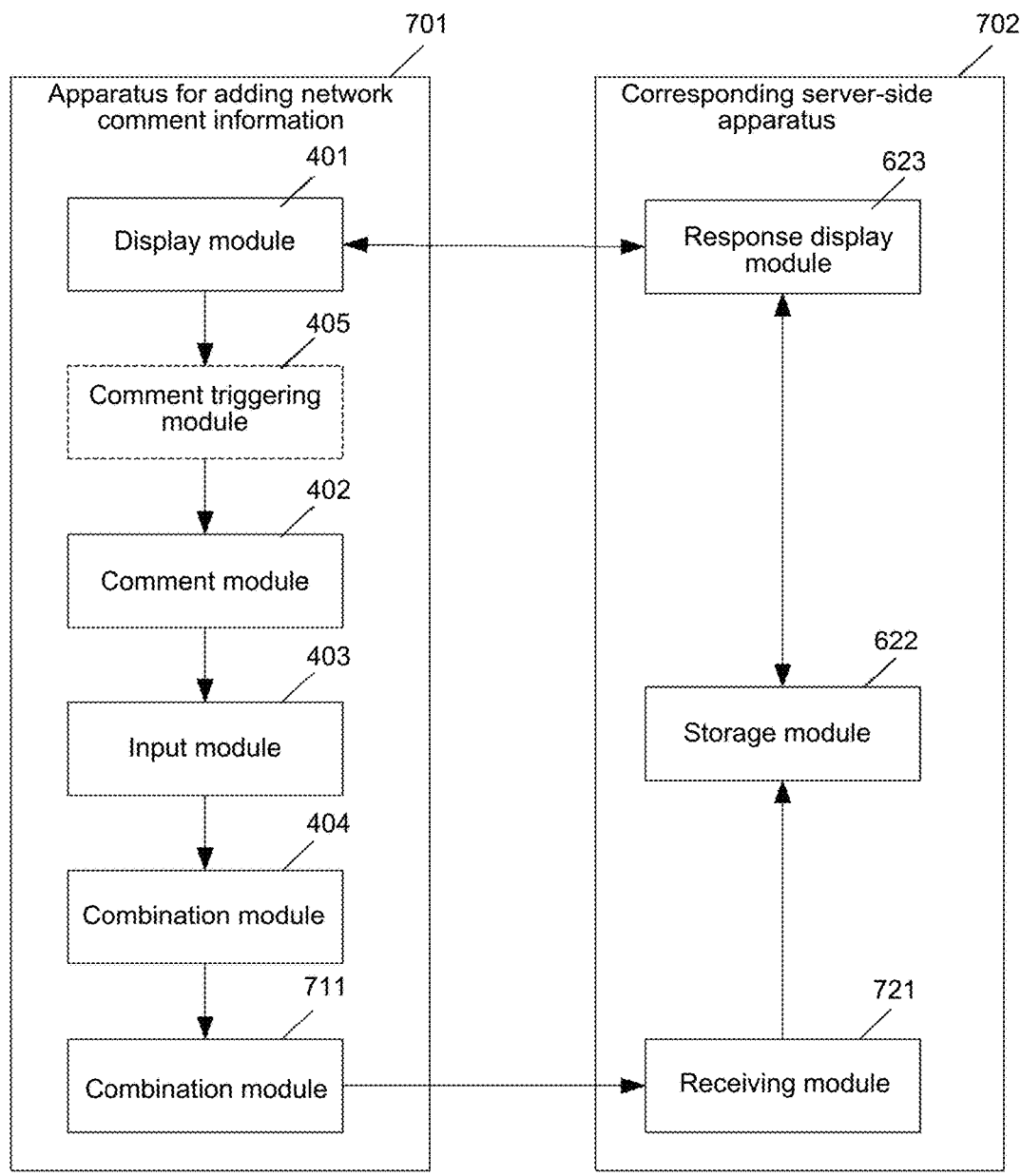
FIG. 7 is a schematic structural diagram of an apparatus for adding network comment information and a server in accordance with some embodiments.

FIG. 7 is a schematic structural diagram of an apparatus for adding network comment information and a server-side apparatus corresponding thereto in accordance with some embodiments. The apparatus 701 for adding network comment information is set on a user side, that is, a foreground, and specifically includes: a display module 401, for acquiring and displaying a picture; a comment module 402, for displaying an input unit; an input module 403, for receiving an image input through the entry region, and determining relative positions of the input image and the picture; a combination module 404, for combining the picture and the input image according to the relative positions, to generate a new picture; and an uploading module 711, for uploading a combined new picture to a server side.

In addition, the apparatus further includes: a comment triggering module 405, for determining whether a trigger instruction for commenting on the picture is received, and after the trigger instruction is received then triggering and starting the comment module.

In accordance with some embodiments, server-side apparatus 702 includes: a receiving module 721, for receiving the combined new picture uploaded by the apparatus 701; a storage module 622, for storing the picture and the new picture; and a response display module 623, for responding to a request of the display module 401, reading the new picture from the storage module, and returning the new picture to the display module.

Afterwards, if a user comments on the new picture again, a new picture may be generated through combination, uploaded to a server-side apparatus, and stored in the storage module 622; and if the display module on the user side requests the picture, the server-side apparatus returns a latest picture to the display module on the user side for display.

In accordance with some embodiments, a data processing program stored in a storage medium is often implemented by directly reading the program out of the storage medium or installing or copying the program in the storage device (such as a hard disk or a memory) of the data processing device. Therefore, such storage media also constitute the present technology. The storage medium may use a recording manner of any type, such as a paper storage medium (such as a paper tape), a magnetic storage medium (such as a soft disk, a hard disk, a flash memory), an optical storage medium (such as a CD-ROM), and a magneto-optical storage medium (such as an MO), but not limited to these storage medium. Therefore, some embodiments further disclose a storage medium, in which a data processing program is stored; and the data processing program is used for executing any embodiments.

Figure 8:
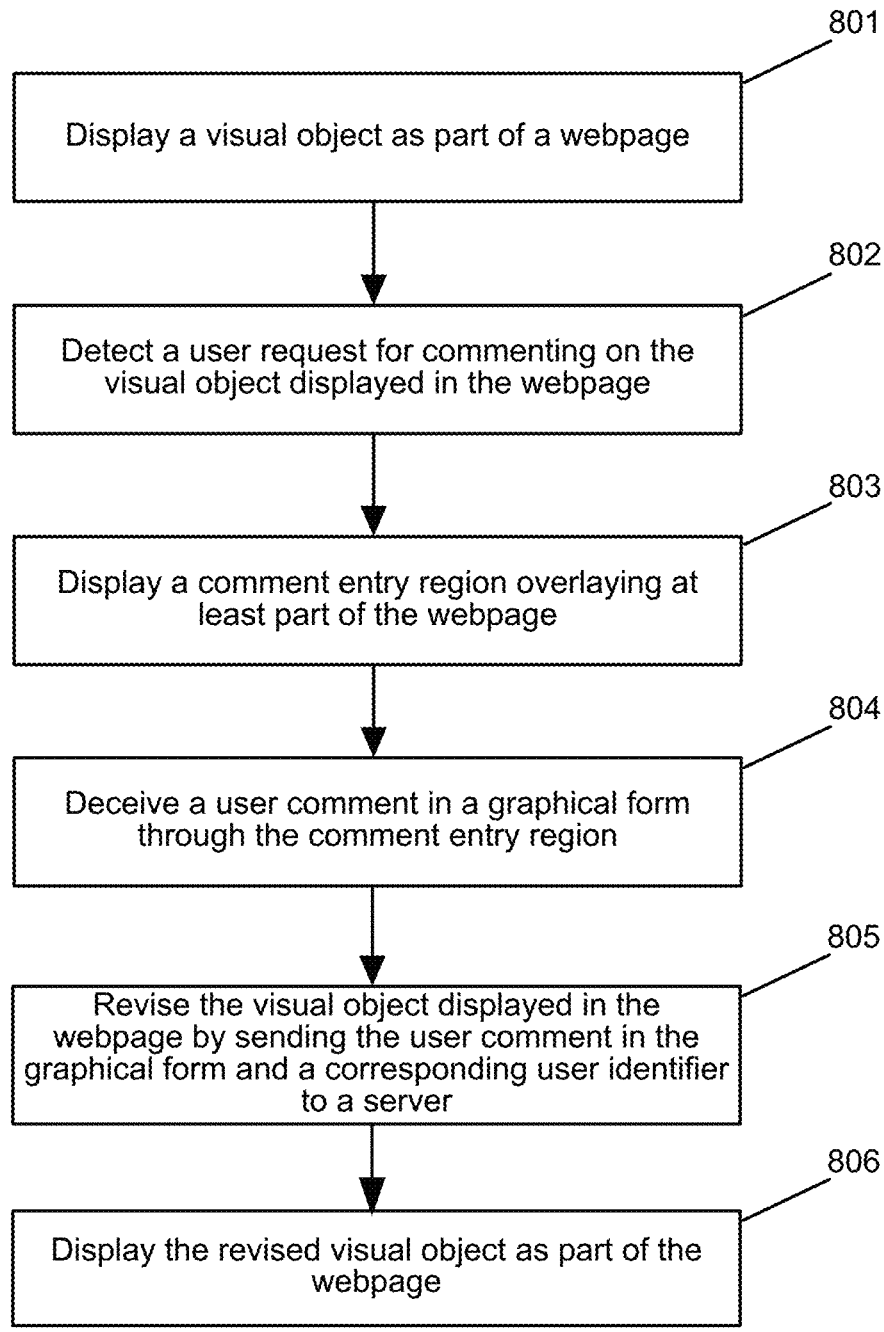
FIG. 8 is a flowchart of a method of facilitating user comments on webpages in accordance with some embodiments.

In accordance with some embodiments, FIG. 8 is a flowchart of a method of facilitating user comments on webpages. In accordance with some embodiments, the method is performed at a user device having one or more processors and memory for storing one or more programs to be executed by the one or more processors. The user device communicates with a server managing webpages with regard to the user comments. The user device can be a smart phone, a tablet computer, a desktop, etc.

In accordance with some embodiments, in a step 801, the user device displays a visual object as part of a webpage. The visual object can be images, text, and other things that can be displayed on the webpage. In accordance with some embodiments, the user device uses a web browser to open the webpage. For example, a user may open a social network webpage and views a birthday party picture of a friend.

In accordance with some embodiments, in a step 802, the user device detects a user request for commenting on the visual object displayed in the webpage, the user request comprising a predetermined user input directed to the visual object displayed on the webpage.

Figure 3D:
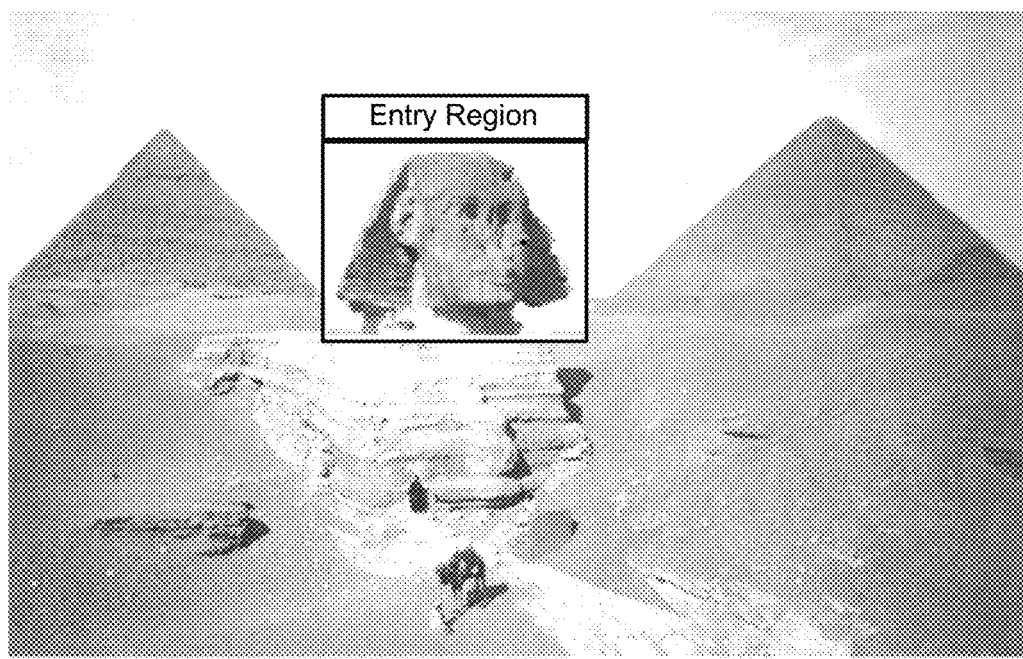

In accordance with some embodiments, the user input includes the user selecting the visual object. For example, the user may drag and select a paragraph or touches a picture. For example, when a webpage displays several picture and paragraphs of text, the user right clicks a picture and selects "comment" to select the picture. In accordance with some embodiments, detecting the user request for commenting on the visual object displayed in the webpage comprises: detecting the user selection of an area within the visual object. For example, the visual object is an article and the user selects a sentence in the article. For another example, the user double-clicks a position, and a paragraph is selected. For another example, the visual object is an image and the user drags the mouse to select part of the image. FIG. 3*d* shows the head of a Sphinx is selected.

In accordance with some embodiments, in a step 803, in response to the user request for commenting on the visual object, the user device displays a comment entry region overlaying at least part of the webpage.

In accordance with some embodiments, in response to the user request for commenting on the visual object, displaying the comment entry region overlaying at least part of the webpage comprises: acquiring visual content in the selected area within the visual object; and displaying the acquired visual content in the comment entry region. In accordance with some embodiments, the comment entry region can be a pop up window, another webpage that replaces the current webpage including the visual object, a transparent or semi-transparent layer, a visually selected area within the visual object, etc. For example, FIGS. 3*c* and 3*d* each shows a comment entry region in an image. FIG. 3*c* shows a comment entry region, which is a transparent layer.

In accordance with some embodiments, the acquired visual content is displayed to be larger in the comment entry region than in the visual object. In some embodiments, the entry region is of fixed size. In some embodiments, the user can resize the comment entry region to make the acquired visual content to appear even larger such that any editing input can be placed over it more accurately. In some embodiments, the acquired visual content can be displayed as a background of the comment entry region. The acquired visual content is displayed to be larger in the comment entry region than in the visual object. The acquired visual content can be displayed as a background of the comment entry region. For example, the acquired visual content is part of an image, that part of the image is enlarged in the entry region, as illustrated in FIG. 3*d*.

In accordance with some embodiments, its 804, the user device receives a user comment in a graphical form through the comment entry region. In accordance with some embodiments, the user comment can be drawings, images, text, video, audio or in other formats.

Figure 3E:

In accordance with some embodiments, receiving the user comment through the comment entry region comprises: in the comment entry region, receiving the user's drawing input, inserted text, image, video or audio document, manipulation of the displayed content, etc. For example, FIG. 3*e* illustrates a user manipulating the displayed object by moving the head of Sphinx.

The "user's comment in a graphical form" can be handwritten words, text converted into image, inserted images, or drawings. The comment entry region can be provided with various tools, such as text input tool, selection tool, shapes, different pen styles, colors, a water marking tool, a stamp, an air brushing tool, etc. In some embodiments, the user can enter text and the user device converts the text into figures.

In accordance with some embodiments, its 805, the user device revises the visual object displayed in the webpage by sending the user comment in the graphical form and a corresponding user identifier to a server managing the webpage In accordance with some embodiments, the comment can be anonymous. For anonymous comments, the user ID is anonymous. The server may still determine whether some comments from a user should be posted or incorporated into the visual object, but the comment is anonymous, not showing the user ID.

In accordance with some embodiments, the server generates a revised visual object by combining the visual object and the user comment in the graphical form. In some embodiments, the visual object in the claim includes all existing comments that have been incorporated into the image. In some embodiments, the visual object does not include any of the existing comments that have already been made on the visual object. For example, the webpage includes a toggle switch that lets the user see the visual object in an uncommented state, and a commented state. As a result, the revised visual object can be the visual object in the commented stated. The user can also turn on various filters to see different subsets of the comments made on the visual object.

In some embodiments, if the visual object already includes existing comments, then the new comment can be an addition to the visual object. In some embodiments, the new comment can be directed to the existing comments. For example, a first user adds an image to the original picture, and a second user hand draws some comments to the image or clicks a "recommend" button. In some embodiments, if the visual object does not include existing comments, then the revised visual object includes the comment provided by the user, and any other comments that already exist.

In accordance with some embodiments, the server rotates the user comments in the visual object. For example, the server receives 50 comments directed to a picture. When a user opens a webpage including the picture, it is not possible or practical to display all comments at once. The comments might be too crowded, some manipulations are incompatible with each other, and the user may not want to view all comments all at once. Instead, the server selects 40 comments based on various criteria and displays three of the 40 comments in the picture at the same time. The three comments are displayed for five seconds and are replaced by the next three comments. The user may stop the comment rotation, rotate back to previous comments, or fast forward to following comments.

In accordance with some embodiments, the server adjusts the received user comment based on predetermined adjustment criteria. Therefore, the revised visual object includes the user comment in the graphical form as adjusted by the server in accordance one or more predetermined adjustment criteria. In accordance with some embodiments, adjustment of the user comment by the server includes one or more of changing positions, sizes, colors, brightness, thickness, or layers of the user comment in the graphical form. For example, a graphical comment is originally inputted by the user to be very large. The server may find that the graphical comment blocks the original picture or other comments and shrinks the graphical comment. For another example, if one graphical comment is marked as "dislike" by many users, the server sends the graphical comment to the bottom layer of comments.

In accordance with some embodiments, the criteria include setting editable regions and non-editable regions in the visual object. The editable regions allow the user to leave comments, at least in certain permissible ways. The non-editable regions do not accept any comments. The principle of distinguishing the editable regions from the non-editable ones includes making the overall appearance of the visual object more pleasing. For example, in FIG. 3a, the pyramids and Sphinx are not suitable to be covered by other drawings. Adding new images covering the pyramids or Sphinx may destroy the original meaning of the picture. If that is the case, the server may adopt criteria that the pyramids and Sphinx are not editable, while the rest of the picture belongs to editable regions. In this case, the manipulation of FIG. 3e might not be allowed by the criteria. In some embodiments, the criteria include computer recognizable characteristics: the brightness, color, intensiveness of shapes, size of continuous areas, whether including human face, whether including text or text images, whether including other comments, etc.

In accordance with some embodiments, adjustment of the user comment in the graphical form is based on the plurality of comments from the multiple users. For example, the server may arrange all editing inputs in an orderly way. There might be 20 users each posting some text comments. The server may change the fonts and color and the text and hide portions of long comments, move the comments into alignments.

In accordance with some embodiments, adjustment of the user comment in the graphical form is based on a plurality of inputs from other user IDs and directed to the user comment. These inputs include "like," "+1," "share," "email," etc. In some embodiments, the criteria include the number of "+" and "−" type comments received for each of the existing comments.

In accordance with some embodiments, in a step 806, the user device displays the revised visual object as part of the webpage, the revised visual object including the user comment in the graphical form.

In accordance with some embodiments, the plurality of comments from the multiple users are selected in accordance with predetermined criteria. In accordance with some embodiments, either the user device or the server may select a few comments to be displayed. For example, the predetermined criteria may include the newest 10 comments, the top 5 recommended comments, text comments only, image comments only, the most emailed comments, my comments only, comments within last five days, comments from friends, etc.

In accordance with some embodiments, when the user wants to select comments, the user device sends the predetermined criteria along with a request to the server managing the webpage, the request being configured to cause the server to select the plurality of comments from the multiple users in accordance with the predetermined criteria. For example, the user wants to search comments. The user may type in two search terms: "Michigan based" and "today." Receiving the two search terms as criteria, the server then updates the webpage to display only comments that are originated from Michigan and inputted within today.

In accordance with some embodiments, the server displays the comments into different layers based on different criteria such that the current user can see different layers by turning on different filters. The criteria may include relationships to the current user, location, level of agreement with others, number of followers, etc. For example, the user device displays options of "friends only," "Comments from local State only," etc. When a user selects one of the options, either the user device or the server moves a plurality of comments to the top in accordance with the selected option. The user device can move the comments that meet the criteria corresponding to the selected option into different layers. Alternatively, the user device may send the criteria corresponding to the selected option to the server and the server will move the comments into different layers.

Figure 9:
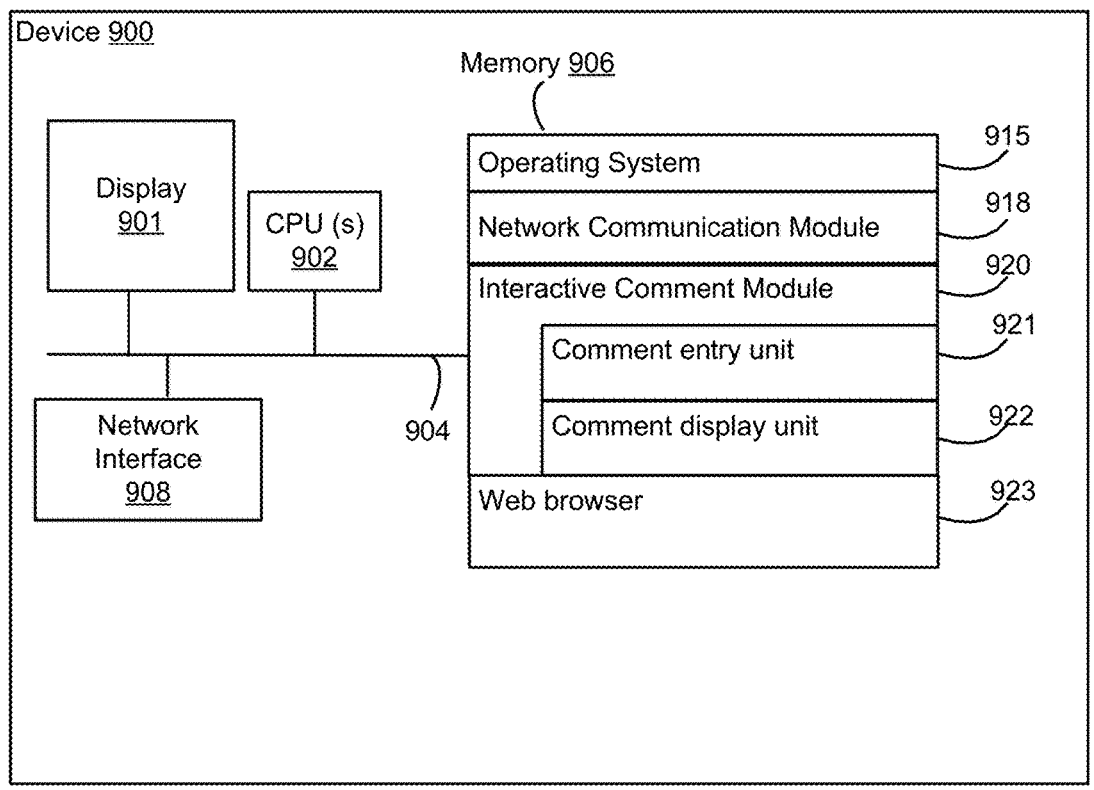
FIG. 9 is a diagram of an example implementation of a user device in accordance with some embodiments.

FIG. 9 is a diagram of an example implementation of a user device 900 in accordance with some embodiments.

While certain specific features are illustrated, those skilled in the art will appreciate from the present disclosure that various other features have not been illustrated for the sake of brevity and so as not to obscure more pertinent aspects of the implementations disclosed herein. To that end, the user device 900 includes one or more processing units (CPU's) 902, one or more network or other communications interfaces 908, a display 901, memory 906, and one or more communication buses 904 for interconnecting these and various other components. The communication buses may include circuitry (sometimes called a chipset) that interconnects and controls communications between system components. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 may optionally include one or more storage devices remotely located from the CPU(s) 902. The memory 906, including the non-volatile and volatile memory device(s) within the memory 906, comprises a non-transitory computer readable storage medium.

In some implementations, the memory 906 or the non-transitory computer readable storage medium of the memory 906 stores the following programs, modules and data structures, or a subset thereof including an operating system 916, a network communication module 918, an interactive comment module 920 and a web browser 923.

In accordance with some embodiments, the operating system 916 includes procedures for handling various basic system services and for performing hardware dependent tasks.

In accordance with some embodiments, the network communication module 918 facilitates communication with other devices via the one or more communication network interfaces 908 (wired or wireless) and one or more communication networks, such as the internet, other wide area networks, local area networks, metropolitan area networks, and so on.

In accordance with some embodiments, the interactive comment module 920 is configured to detect a user request for commenting, display a comment entry region, receive a user comment through the comment entry region, and revise the visual object. In accordance with some embodiments, the interactive comment module 920 comprises a comment entry unit 921, and a comment display unit 922.

In accordance with some embodiments, the comment entry unit 921 is configured to detect user requests for commenting, display the comment entry region and receive user comments through the comment entry region. In some embodiments, the comment entry unit 921 provides the comment entry region with various commenting tools, such as text input tool, selection tool, shapes, different pen styles, colors, a water marking tool, a stamp, an air brushing tool, etc.

In accordance with some embodiments, the comment display unit 922 is configured to display both original and revised visual objects as part of a webpage. In some embodiments, the comment display unit 922 provides the functions of choosing which or any of the comments should be displayed in the visual objects.

In accordance with some embodiments, the web browser 923 can be any web browsers, including Internet Explorer, Firefox, Chrome, etc. In accordance with some embodiments, the interactive comment module 920 is a plug-in, an add-on or an extension of the web browser 923.

Figure 10:
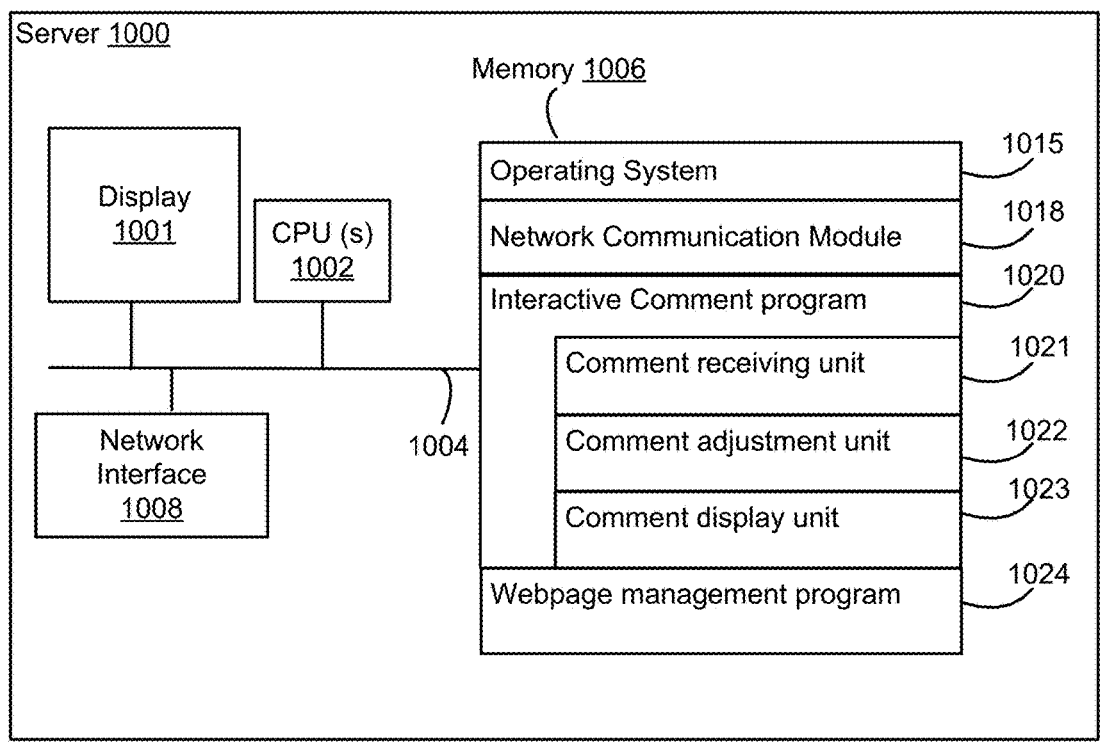
FIG. 10 is a diagram of an example implementation of a server in accordance with some embodiments.

FIG. 10 is a diagram of an example implementation of a webpage server 1000 in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the webpage server 1000 includes one or more processing units (CPU's) 1002, one or more network or other communications interfaces 1008, a display 1001, memory 1010, and one or more communication buses 1004 for interconnecting these and various other components. The communication buses may include circuitry (sometimes called a chipset) that interconnects and controls communications between system components. The memory 1010 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1010 may optionally include one or more storage devices remotely located from the CPU(s) 1002. The memory 1010, including the non-volatile and volatile memory device(s) within the memory 1010, comprises a non-transitory computer readable storage medium.

In some implementations, the memory 1010 or the non-transitory computer readable storage medium of the memory 1010 stores the following programs, modules and data structures, or a subset thereof including an operating system 1016, a network communication module 1018, an interactive comment program 1020 and a webpage management program 1024.

In accordance with some embodiments, the operating system 1016 includes procedures for handling various basic system services and for performing hardware dependent tasks.

In accordance with some embodiments, the network communication module 1018 facilitates communication with other devices via the one or more communication network interfaces 1008 (wired or wireless) and one or more communication networks, such as the interne, other wide area networks, local area networks, metropolitan area networks, and so on.

In accordance with some embodiments, the interactive comment program 1020 is configured to receive user comments, combine the visual objects and user comments, adjust the user comments, and display selected user comments. In accordance with some embodiments, the interactive comment program 1020 comprises a comment receiving unit 1021, a comment adjustment unit 1022 and a comment display unit 1023.

In accordance with some embodiments, the comment receiving unit 1021 is configured to receive comments from users. The comment receiving unit is also configured to reject any comments that do not meet requirement, e.g., comments that are too long, comments from unauthorized users.

In accordance with some embodiments, the comment adjustment unit 1022 is configured to adjust user comments in accordance with one or more predetermined adjustment criteria. In accordance with some embodiments, the comment adjustment unit 1022 is configured to customize the displayed content based on received user ID. For example, a user may send comment display criteria to the server, and the comment adjustment unit 1022 adjusts the user comments based on these criteria.

In accordance with some embodiments, the comment display unit 1023 is configured to display comments. In some embodiments, the comment display unit 1023 receives adjustment instruction from the comment adjustment unit 1022.

In accordance with some embodiments, the webpage management program 1024 provides and updates webpages including the visual objects.

While particular embodiments are described above, it will be understood it is not intended to limit the technology to these particular embodiments. On the contrary, the technology includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined, replaced or taken out. While some reordering or other groupings are specifically mentioned, others will be obvious to those of ordinary skill in the art, therefore, does not present an exhaustive list of alternatives. Moreover, it should be recognized that the stages could be implemented in hardware, firmware, software or any combination thereof (what about the cloud).

The foregoing description, for purpose of explanation, has been described with reference to specific embodiments. However, the illustrative discussions above are not intended to be exhaustive or to limit the technology to the precise forms disclosed. Many modifications and variations are possible in view of the above teachings. The embodiments were chosen and described in order to best explain the principles of the technology and its practical applications, to thereby enable others skilled in the art to best utilize the technology and various embodiments with various modifications as are suited to the particular use contemplated.

What is claimed is:

1. A method of adding user comments on webpages, the method comprising:
    at a computing device having one or more processors and memory for storing one or more programs to be executed by the one or more processors:
    displaying a webpage including a visual object;
    receiving a user selection of at least a portion of the visual object for adding comments on the visual object;
    in response to the user selection of the portion of the visual object, generating a transparent layer within the webpage, the transparent layer including a comment entry region, wherein the comment entry region includes an enlarged visual content of the portion of the visual object as a background in the comment entry region;
    concurrently displaying the enlarged visual content of the portion of the visual object in the comment entry region and the remaining portion of the visual object of the webpage that is not selected by the user;
    receiving a user comment in a graphical form through the comment entry region; and
    sending the user comment in the graphical form and a corresponding user identifier to a server managing the webpage, wherein the server generates a revised webpage by combining the visual object and the user comment in the graphical form.

2. The method of claim 1, further comprising:
    receiving the revised webpage from the server; and
    displaying the revised visual object including the user comment in the graphical form.

3. The method of claim 1, wherein receiving the user comment through the comment entry region comprises:
    receiving the user's drawing input in the comment entry region.

4. The method of claim 1, wherein the revised webpage includes the user comment in the graphical form as adjusted by the server in accordance with one or more predetermined adjustment criteria.

5. The method of claim 4, wherein adjustment of the user comment by the server includes one or more of changing positions, sizes, colors, brightness, thickness, or layers of the user comment in the graphical form.

6. The method of claim 4, wherein adjustment of the user comment in the graphical form is based on a plurality of inputs from other user IDs and directed to the user comment.

7. A computing device, comprising:
    one or more processors;
    memory; and
    one or more programs stored in the memory and for execution by the one or more processors, wherein the one or more programs, when executed by the one or more processors, cause the computing device to perform the following operations:
    displaying a webpage including a visual object;
    receiving a user selection of at least a portion of the visual object for adding comments on the visual object;
    in response to the user selection of the portion of the visual object, generating a transparent layer within the webpage, the transparent layer including a comment entry region, wherein the comment entry region includes an enlarged visual content of the portion of the visual object as a background in the comment entry region;
    concurrently displaying the enlarged visual content of the portion of the visual object in the comment entry region and the remaining portion of the visual object of the webpage that is not selected by the user;
    receiving a user comment in a graphical form through the comment entry region; and
    sending the user comment in the graphical form and a corresponding user identifier to a server managing the webpage, wherein the server generates a revised webpage by combining the visual object and the user comment in the graphical form.

8. The device of claim 7, wherein the operations further comprise:
    receiving the revised webpage from the server; and
    displaying the revised visual object including the user comment in the graphical form.

9. The device of claim 7, wherein receiving the user comment through the comment entry region comprises:
    receiving the user's drawing input in the comment entry region.

10. The device of claim 7, wherein the revised visual object includes the user comment in the graphical form as adjusted by the server in accordance with one or more predetermined adjustment criteria.

11. The device of claim 10, wherein adjustment of the user comment by the server includes one or more of changing positions, sizes, colors, brightness, thickness, or layers of the user comment in the graphical form.

12. The device of claim 10, wherein adjustment of the user comment in the graphical form is based on a plurality of inputs from other user IDs and directed to the user comment.

13. A non-transitory computer-readable storage medium having instructions stored thereon, wherein the instructions, when executed by one or more processors of a computing device, cause the computing device to perform the following operations:
displaying a webpage including a visual object;
receiving a user selection of at least a portion of the visual object for adding comments on the visual object;
in response to the user selection of the portion of the visual object, generating a transparent layer within the webpage, the transparent layer including a comment entry region, wherein the comment entry region includes an enlarged visual content of the portion of the visual object as a background in the comment entry region;
concurrently displaying the enlarged visual content of the portion of the visual object in the comment entry region and the remaining portion of the visual object of the webpage that is not selected by the user;
receiving a user comment in a graphical form through the comment entry region; and
sending the user comment in the graphical form and a corresponding user identifier to a server managing the webpage, wherein the server generates a revised webpage by combining the visual object and the user comment in the graphical form.

14. The non-transitory computer-readable storage medium of claim 13, wherein the operations further comprise:
receiving the revised webpage from the server; and
displaying the revised visual object including the user comment in the graphical form.

15. The non-transitory computer-readable storage medium of claim 13, wherein receiving the user comment through the comment entry region comprises:
receiving the user's drawing input in the comment entry region.

16. The non-transitory computer-readable storage medium of claim 13, wherein the revised visual object includes the user comment in the graphical form as adjusted by the server in accordance with one or more predetermined adjustment criteria.

17. The non-transitory computer-readable storage medium of claim 16, wherein adjustment of the user comment by the server includes one or more of changing positions, sizes, colors, brightness, thickness, or layers of the user comment in the graphical form.

18. The non-transitory computer-readable storage medium of claim 16, wherein adjustment of the user comment in the graphical form is based on a plurality of inputs from other user IDs and directed to the user comment.

* * * * *